(12) United States Patent
Raikwar et al.

(10) Patent No.: US 9,258,020 B2
(45) Date of Patent: Feb. 9, 2016

(54) SCALABLE MAPPING WITH INTEGRATED SUMMING OF SAMPLES FOR MULTIPLE STREAMS IN A RADIO INTERFACE FRAME

(71) Applicant: LSI Corporation, San Jose, CA (US)

(72) Inventors: Avinash Kant Raikwar, Bangalore (IN); Amit Kumar Mishra, Cape Town (SA)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/289,893

(22) Filed: May 29, 2014

(65) Prior Publication Data
US 2015/0349811 A1    Dec. 3, 2015

(51) Int. Cl.
*H04B 1/04* (2006.01)
*H04B 1/38* (2015.01)
*H04W 88/08* (2009.01)

(52) U.S. Cl.
CPC .. *H04B 1/04* (2013.01); *H04B 1/38* (2013.01); *H04W 88/085* (2013.01)

(58) Field of Classification Search
CPC ............ H04B 1/38; H04B 1/04; H04L 12/66; H04W 88/10; H04W 88/085; H04J 3/16
USPC .................... 375/220, 295; 370/537; 455/561
See application file for complete search history.

(56) References Cited

U.S. PATENT DOCUMENTS

| | | | |
|---|---|---|---|
| 8,005,152 B2 | 8/2011 | Wegener | 375/241 |
| 8,174,428 B2 | 5/2012 | Wegener | 341/173 |
| 8,320,433 B2 | 11/2012 | Wegener | 375/219 |
| 8,331,461 B2 | 12/2012 | Wegener | 375/241 |
| 8,705,634 B2 | 4/2014 | Wegener | 375/241 |
| 2009/0181663 A1* | 7/2009 | Hu et al. | 455/422.1 |
| 2011/0125936 A1* | 5/2011 | Malleth et al. | 710/26 |
| 2012/0057572 A1 | 3/2012 | Evans et al. | 370/338 |
| 2014/0079037 A1 | 3/2014 | Evans et al. | 370/336 |

OTHER PUBLICATIONS

T. Hentschel and G. Fettweis, "The digital front-end: Bridge between RF and baseband processing," in Software Radio Enabling Technologies, W. Tuttlebee, Ed. New York: Wiley, 2002, pp. 1-58.
OBSAI, "Open Base Station Architecture Initiative," BTS System Reference Document Version 2.0, 2006, pp. 16-19.

* cited by examiner

*Primary Examiner* — Betsy Deppe
(74) *Attorney, Agent, or Firm* — Suiter Swantz pc llo

(57) ABSTRACT

An apparatus includes a first circuit, a second circuit, and a third circuit. The first circuit may be configured to buffer a plurality of antenna carrier sample streams. The second circuit is coupled to the first circuit and may be configured to generate message data through pipelined processing and mapping of the antenna carrier samples. The third circuit is coupled to the second circuit and may be configured to generate a master frame in response to the processed and mapped message data.

20 Claims, 9 Drawing Sheets

SCALABLE MAPPING WITH INTEGRATED SUMMING OF SAMPLES FOR MULTIPLE STREAMS IN A RADIO INTERFACE FRAME

FIELD OF THE INVENTION

The invention relates to distributed radio base stations generally and, more particularly, to a method and/or apparatus for implementing scalable mapping with integrated summing of samples for multiple streams in a radio interface frame.

BACKGROUND

In mobile communications, industry standardization of radio interface protocols used to connect radio frequency (RF) and baseband (BB) modules in modern base stations is increasing. The radio interface protocols transfer baseband data over high speed long distance serial links between Remote Radio Heads (RF Modules) and Baseband Processors. Conventional radio interfaces connecting radio frequency (RF) and baseband (BB) modules have a built-in capability of combining and distributing samples. While combining samples, input samples that are targeted to the same antenna and carrier at the same instant in time are added together so that a single output sample stream is formed. The single sample stream is then transferred to the desired RF module. Conventionally, the summing is located in front of a transmitter of the transceiver and adds together the samples in the payloads of the messages.

It would be desirable to have a method and/or apparatus for implementing scalable mapping with integrated summing of samples for multiple streams in a radio interface frame.

SUMMARY

The invention concerns an apparatus including a first circuit, a second circuit, and a third circuit. The first circuit may be configured to buffer a plurality of antenna carrier sample streams. The second circuit is coupled to the first circuit and may be configured to generate message data through pipelined processing and mapping of the antenna carrier samples. The third circuit is coupled to the second circuit and may be configured to generate a master frame in response to the processed and mapped message data.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a method and/or apparatus for implementing scalable mapping with integrated summing of samples for multiple streams in a radio interface frame that may (i) provide an integrated methodology and architecture to perform summing and mapping of messages in radio interface frames, (ii) provide a scalable architecture to combine multiple numbers of streams, (iii) provide flexibility to summing circuit to operate with needed/desirable latencies within a calculated maximum limit, (iv) provide an architecture combining a master frame data buffer (MFDB), an empty slot data buffer (ESDB), and an empty slot pointer buffer (ESPB), (v) provide flexibility to a pipelined summing module (PSM) to consume a predetermined number of cycles and delayed write mechanism to the ESDB, (vi) provide an architecture that is independent of signal processing (e.g., summing, etc.) functionality, (vii) allow other signal processing modules to be used in place of summing, (viii) combine sub-modules in a modular (SFCs, SFs), repetitive, and scalable arrangement that is suitable for IP based designs of interface applications, (ix) provide flexibility to software to program an efficient configuration of antenna carrier stream (AxC) mapping, and/or (x) be implemented as one or more integrated circuits.

In various embodiments, a scalable architecture and algorithmic steps are provided for mapping multiple data streams with integrated summing capability of samples in the radio interface protocols used in modern base stations. Various embodiments may be described in the context of the Open Base Station Architecture Initiative (OBSAI)—Reference Point 3 (RP3) standard interface. However, a scheme in accordance with an embodiment of the invention can be applied to the other open radio interface standards (e.g. Common Public Radio Interface, ORI, etc) that need to multiplex data samples and perform summing operations on variable sized samples. Such standard radio interfaces are typically used in modern Digital Front Ends (DFEs) and Remote Radio Heads (RRHs), which are important components of fast expanding distributed antenna systems and heterogeneous mobile communication networks.

Figure 1:
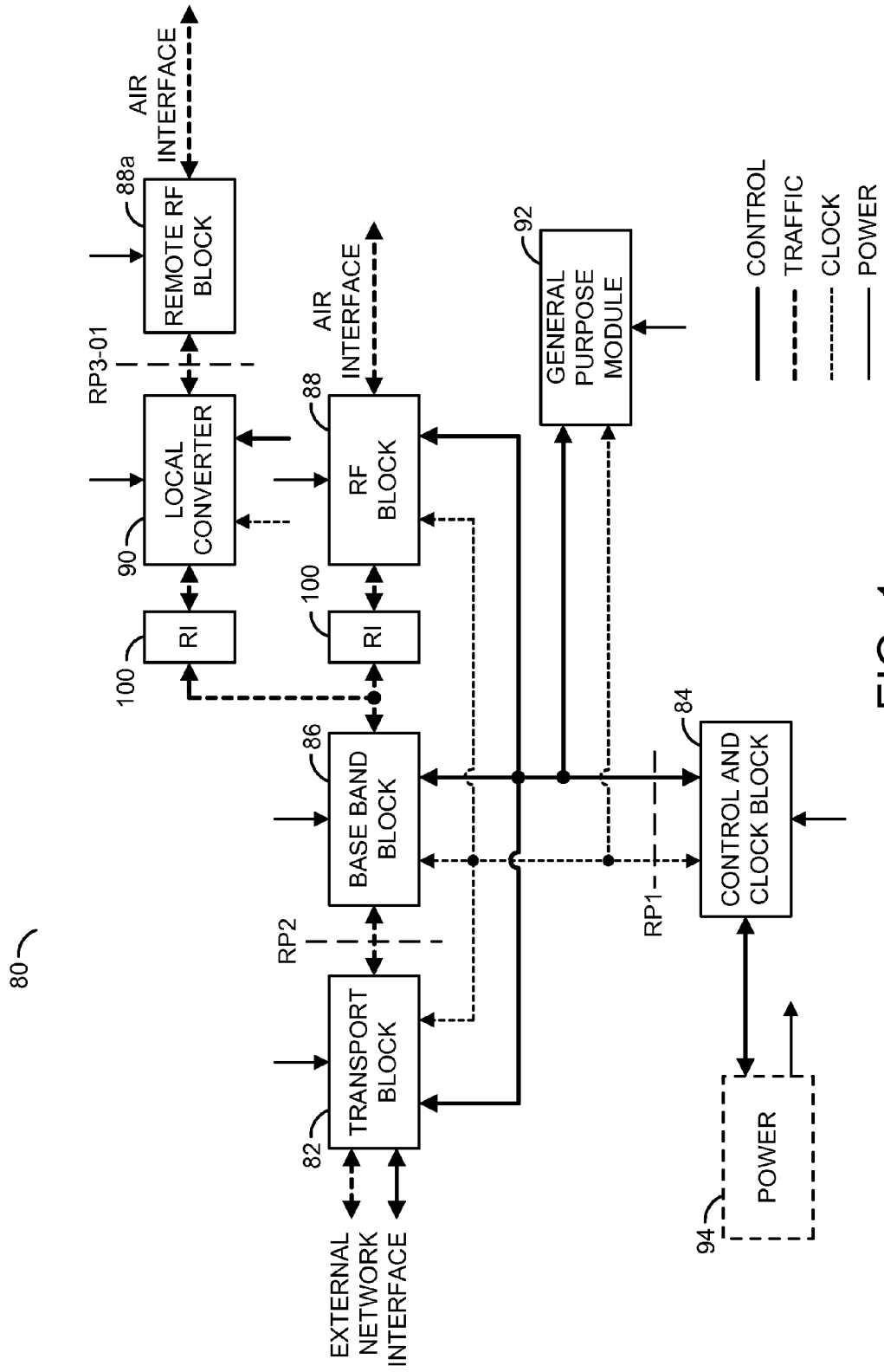
FIG. 1 is a diagram illustrating an example base transceiver station (BTS) architecture in which a radio interface (RI) in accordance with an embodiment of the invention is implemented.

Referring to FIG. 1, a diagram is shown illustrating an example base transceiver station (BTS) architecture 80 in which a radio interface (RI) in accordance with an embodiment of the invention is implemented. In various embodiments, the architecture 80 may be implemented similarly to a base transceiver station (BTS) architecture provided by the Open Base Station Architecture Initiative (OBSAI) trade association, which defines four main functional blocks (or logical entities), interfaces between the functional blocks, and specifications for external interfaces. The four main functional blocks include a Transport block, a Control and Clock block, a Baseband (BB) block, and a Radio Frequency (RF) block.

In various embodiments, the architecture 80 comprises a transport block 82, a control and clock block 84, a baseband (BE) block 86, and a radio frequency (RF) block 88. The architecture 80 also includes one or more remote RF blocks 88a, a local converter 90, one or more general purpose modules 92, and a power module 94. The blocks 82-94 represent a logical grouping of a set of functions and attributes. Each block may comprise one or more modules (or sub-blocks), each of which represents a physical implementation of a subset of the block functions. The blocks 82-94 may be implemented using conventional techniques. The transport block 82 interfaces to an external network and provides functions such as quality of service (QoS), security, and synchronization. The control and clock block 84 maintains coordination of the blocks 82-94. The baseband (BB) block 86 processes a baseband signal and includes functions such as encoding/decoding, ciphering/deciphering, frequency hopping (GSM), spreading and Rake receiver (WCDMA), media access control-MAC (WiMAX), protocol frame processing, multiple-input multiple-output (MIMO), etc. The radio frequency (RF) blocks 88, 88a send and receive signals to/from portable devices (e.g., via the air interface) and convert between digital data and antenna signal. Functions of the radio frequency (RF) blocks 88, 88a include digital-to-analog (D/A) and analog-to-digital (A/D) conversions, up/down conversion, carrier selection, linear power amplification, diversity transmit and receive, RF combining, and RF filtering.

The external network interface may be configured to enable the architecture 80 to communicate with one or more of a Radio Network Controller (RNC) for 3rd Generation Partnership Project (3GPP) systems, a Base Station Controller (BSC) for 3GPP2 systems, and an IEEE 802.16/WiMAX (Worldwide Interoperability Microwave Access) system. An external radio interface may be configured to connect the architecture 80 to one or more of user equipment (UE) for 3GPP systems (e.g., using GSM or WCDMA), Um for 3GPP2 systems, and RI for IEEE 802.16/WiMAX systems. An internal interface between the blocks 82, 84, 86, 88, and 90 may be implemented using an OBSAI Reference Point 1 (RP1) interface. An internal interface between the block 82 and the block 86 may be implemented using an OBSAI Reference Point 2 (RP2) interface. An interface between the block 90 and the block 88a may be implemented using an OBSAI Reference Point 3-01 (RP3-01) interface. The block 86 and the blocks 88 and 90 are communicatively coupled using a radio interface (RI) 100 in accordance with an embodiment of the invention.

The OBSAI RP1 interface interchanges control, performance, status, alarm, and provisioning data between the control and clock block 84 and the other BTS blocks using a protocol specified in the OBSAI RP1 Specification. The RP1 interface also defines an open, standardized interface for exchange of clock and synchronization signals that meet timing, frequency stability, phase noise, and jitter constraints of supported air interfaces. The RP1 interface employs a common clock rate for generation of system clock signals for all blocks and modules within each block. The OBSAI RP2 interface interchanges user data packets between the Transport block 82 and the baseband block 86 using a protocol specified in the OBSAI RP2 Specification. The OBSAI RP3-01 interface interchanges formatted air interface, user, and signaling data between the local converter block 90 and the remote RF block 88a using a combination of protocols specified in the OBSAI RP1 and RP3 Specifications. The RP3 interface transfers fixed length messages (19 bytes). The fixed length messages are time division multiplexed to form Message Groups (MGs). The MGs are further mapped to form Master Frames (MFs). The Master Frames are serialized and transferred over a serializer-deserializer (SerDes) to a receiver on the other end of a serial communication channel.

The radio interface (RI) 100 generally improves upon the OBSAI-RP3 interface standard mapping and summing. The radio interface (RI) 100 can be used for any such interface protocol and is easily expandable and scalable in two dimensions (e.g., support for summing variable sample sizes and support for summing any number of streams) because the delays of the multiple levels/layers of summing (or other processing) modules are accommodated in the architecture. The layers and combinational logic of adders may be implemented using conventional digital design techniques (e.g., half adders, full adders, add/accumulate mechanisms, etc.) and, therefore, are not described. Regardless of how the levels/layers are implemented, the delays of the adders (or other processing steps) are accommodated in the mapping architecture without altering the mapping slots.

Figure 2:
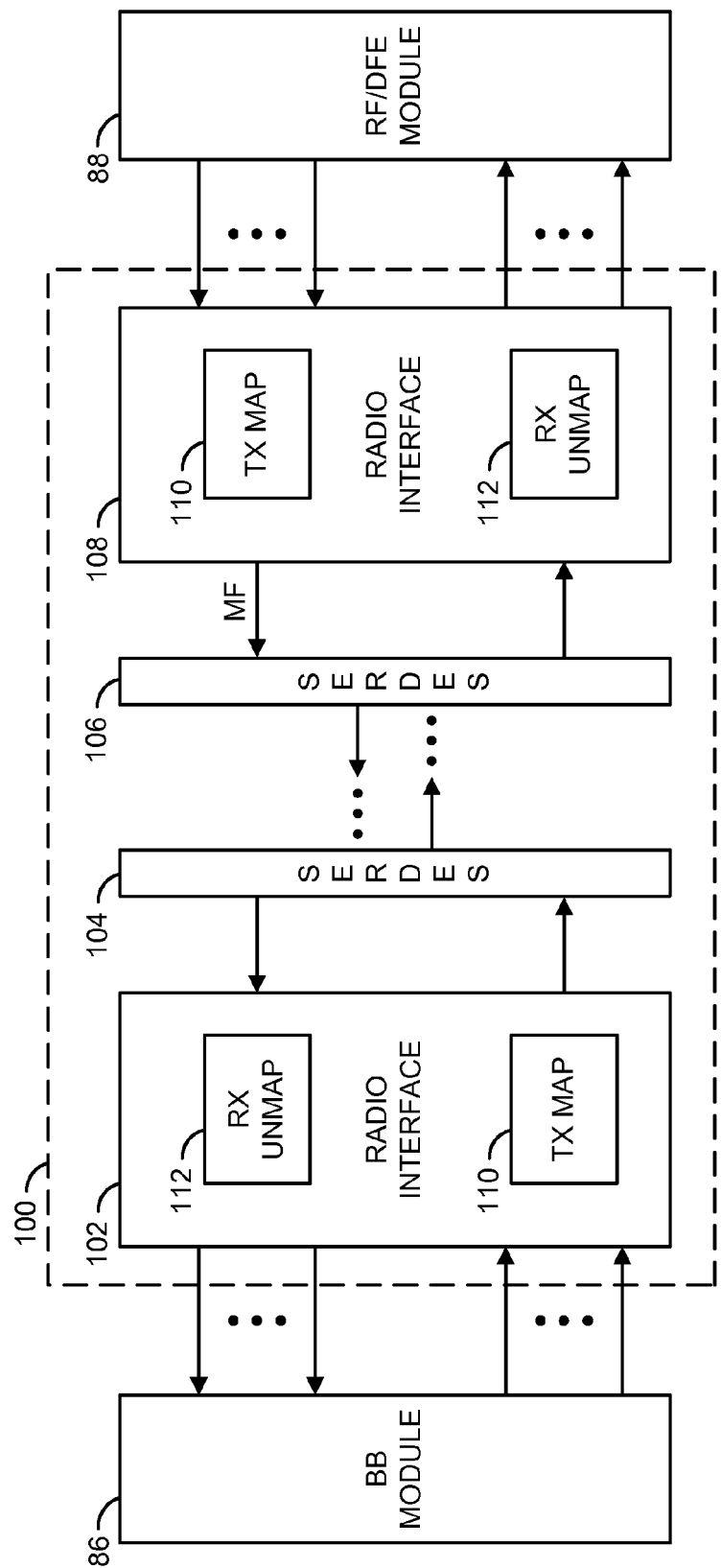
FIG. 2 is a diagram illustrating radio interface links for distributed antenna systems.

Referring to FIG. 2, a diagram is shown illustrating example links of the radio interface 100 of FIG. 1 configured for distributed antenna systems. In various embodiments, the radio interface 100 comprises a first radio interface 102, a first serializer-deserializer (SerDes) 104, a second serializer-deserializer (SerDes) 106 and a second radio interface 108. Each of the radio interfaces 102 and 108 comprise a transmitter map 110 and a receiver map 112. Antenna carrier samples to be transmitted by the RF module 88 are communicated to the radio interface 102 and mapped to a master frame by the transmitter map 110. The master frame is then communicated by the radio interface 102 to the SerDes 104, which transmits the master frame over a serial channel to the SerDes 106 for presentation to the radio interface 108. Similarly, antenna carrier samples received by the RF module 88 are communicated to the radio interface 108 and mapped to a master frame by the transmitter map 110 of the radio interface 106. The master frame is then communicated by the radio interface 108 to the SerDes 106, which transmits the master frame over a serial channel to the SerDes 104 for presentation to the radio interface 102. The transmitter map 110 implements a mapping and integrated summing scheme in accordance with an embodiment of the invention.

Figure 3:
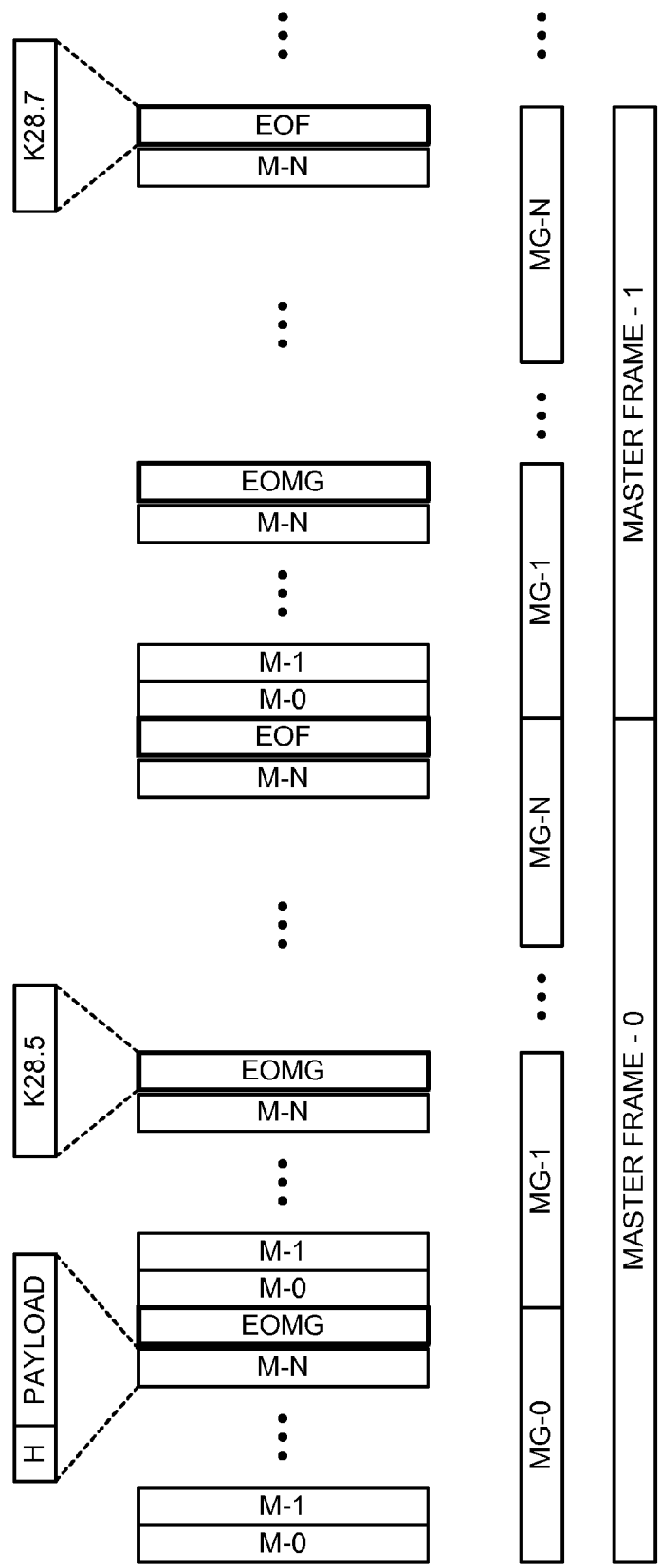
FIG. 3 is a diagram illustrating radio interface sample mapping to a master frame.

Referring to FIG. 3, a diagram is shown illustrating a OESAI-RP3 compliant master frame (MF) in which a set of messages (M-0, . . . , M-N) is grouped to form a Message Group (MG) and a set of message groups (e.g., MG-0, . . . , MG-N) is combined to form the master frame (MF). N is used only to indicate that a group may have a number of messages and a frame may have a number of messages groups. The number of messages in a group and the number of message groups in a master frame may be the same or different. Each message group and master frame ends either with an end of message group (EOMG) or an end of frame (EOF) comprising a number of special characters (e.g., K28.5 and K28.7, respectively). A large set of different message group and master frame definitions are available. In various embodiments, the message slots are not altered by the summing/combining functional block, which needs to operate at the highest speed possible. In various embodiments, the transmission of messages is done with respect to message slot counters using an index/modulo computation over message counters to provide the slots for the messages. The message slots are specified by a pair of numbers (e.g., index (I) and modulo (M)) such that a counter slot is selected when I=(Message counter) Modulo M. Thus, each stream sample is assigned a slot from the message slot counter. When multiple stream samples are chosen, summing of the chosen samples takes place and the combined sample is placed in a corresponding output slot.

Figure 4:
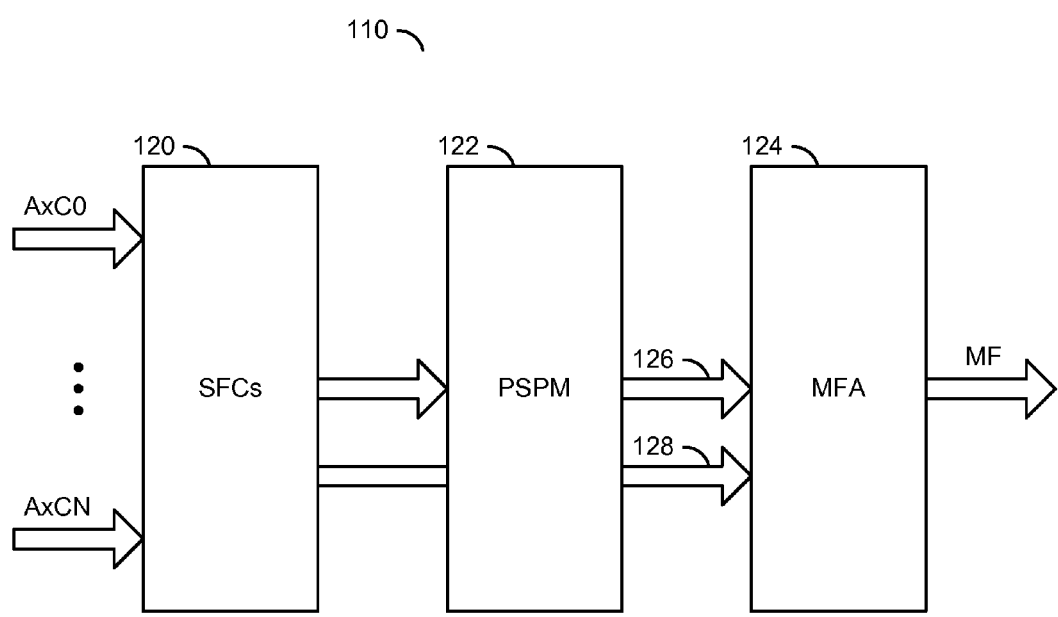
FIG. 4 is a diagram illustrating mapping and integrated summing blocks of the radio interface (RI) of FIG. 1.

Referring to FIG. 4, a diagram is shown illustrating a transmit mapping scheme 110 of FIG. 2. In various embodiments, the transmit mapping scheme 110 comprises three major components: a stream FIFO clusters (SFCs) portion 120, a pipelined signal processing (e.g., summing, etc.) module (PSPM) portion 122, and a master frame assembly (MFA) portion 124. The SFCs portion 120 provides a flexible repetitive shallow buffering to transfer antenna carrier streams to the PSPM portion 122 and the MFA portion 124. The MFA portion 124 combines processed samples 126 from the PSPM portion 122, along with bypassed (unprocessed) samples 128, to form a master frame (MF). In various embodiments, the MFA portion 124 forms the master frame (MF) with the help of a master frame data buffer (MFDB), an empty slot data buffer (ESDB), and an empty slot pointer buffer (ESPB), described below in connection with FIG. 5B. The architecture of the transmit mapping scheme 110 can be scaled based upon the number of streams to be processed (e.g., summed) and mapped.

Figure 5A:
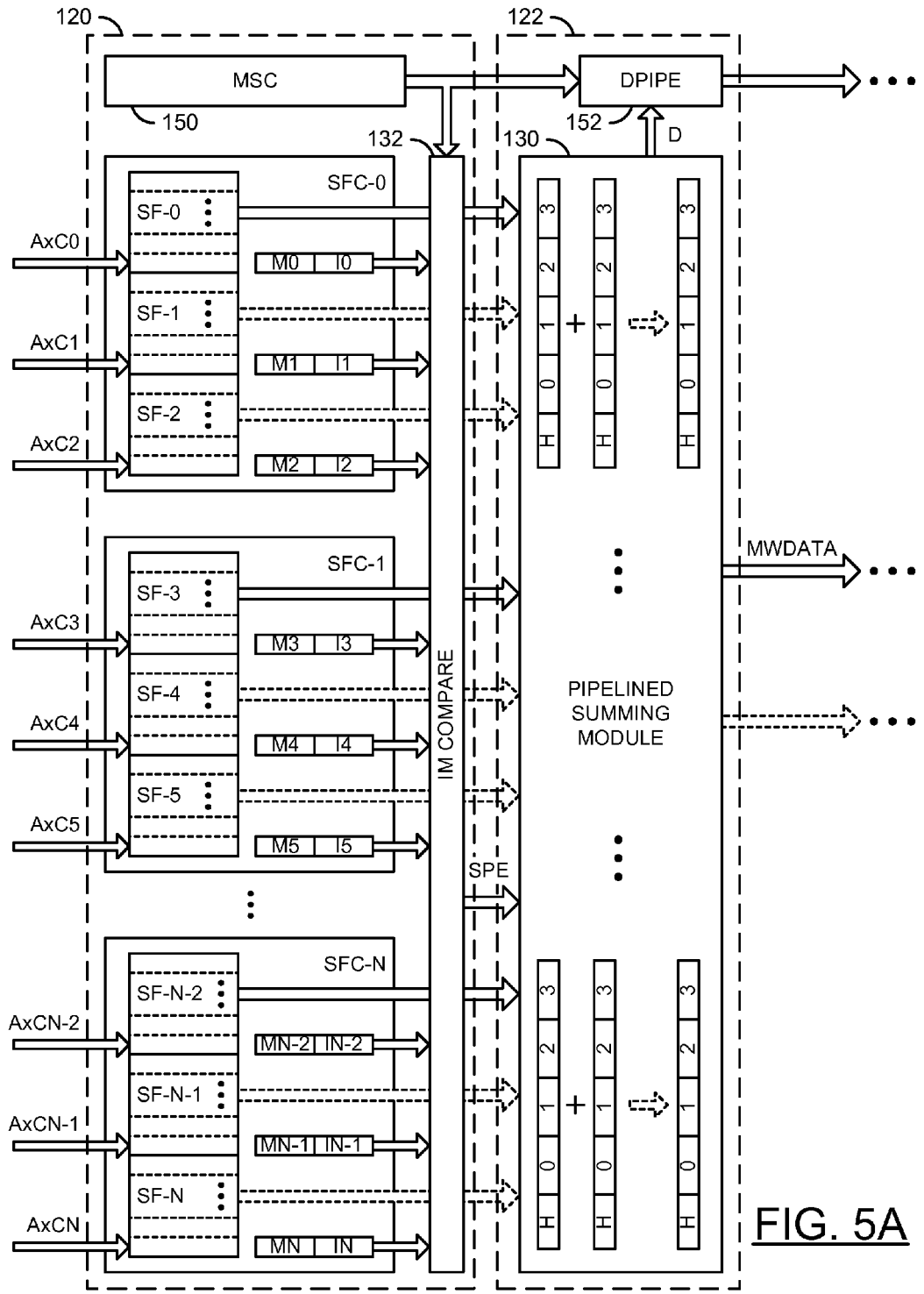
FIGS. 5A and 5B are a diagram illustrating a scheme for mapping and integrated summing of multiple antenna carrier streams in accordance with an embodiment of the invention.
Figure 5B:
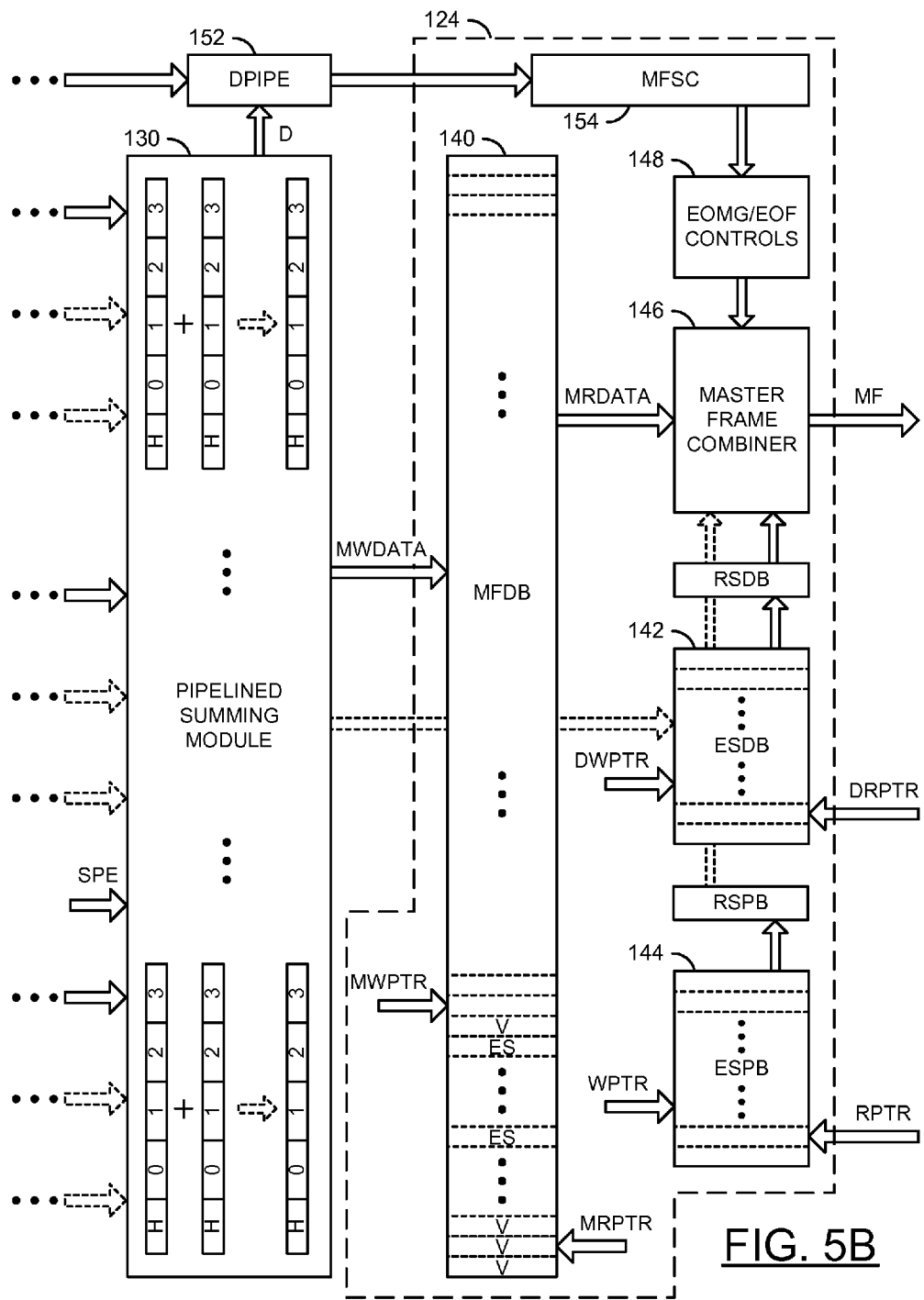

Referring to FIGS. 5A and 5B, a diagram is shown illustrating an example implementation of the portions 120, 122, and 124 of FIG. 4. In various instances, the SFCs portion 120 comprises a number of stream FIFO clusters (e.g., SFC-0, SFC-1 . . . , SFC-n). In some instances, the stream FIFO clusters SFC-0, SFC-1 . . . , SFC-n, the pipelined signal processing module (PSPM) portion 122, and the master frame assembly (MFA) portion 124 are configured to accomplish a summing and integrated master frame mapping of the multiple stream samples in the radio interface frame in accordance with an example embodiment of the invention. The portions 120, 122, and 124 work with other supporting components (e.g., counters, comparator modules, etc., described below). Each of the stream FIFO clusters (SFCs) comprises a cluster of first-in first-out (FIFO) buffers (SFs) taken from a plurality of FIFO buffers (e.g., SF-0, SF-1, . . . , SF-N). The FIFO buffers provide shallow buffering to respective antenna carrier streams of samples (AxCs). Each of the SFCs SFC-0, SFC-1 . . . , SFC-n also has corresponding index (e.g., I0, I1, . . . , In) and modulo (e.g., M0, M1, . . . , Mn) registers for each SF.

In various embodiments, the processing provided by the PSPM portion 122 comprises summing. However, as mentioned above, other types of processing may be implemented accordingly to meet the design criteria of a particular implementation. In embodiments implementing summing, the summing is performed for the samples of streams belonging to different SFCs. A pipeline summing module (PSM) 130 provides the capability of summing the samples when indicated (enabled) by a summing pipeline enable indication, signal, or flag (e.g., SPE). The SPE indication, signal, or flag is generated by an IM Compare Module 132. The pipeline summing module 130 is expected to have a deterministic maximum latency; achieved in some instances by using a standard add and store mechanism for a particular configuration. In various embodiments, the MFA portion 124 comprises a master frame data buffer (MFDB) 140, along with an Empty Slot Data Buffer (ESDB) 142 and an Empty Slot Pointer Buffer (ESPTR) 144, which prepare the master frame (MF) at a Master Frame Combiner (MFC) 146. The final master frame (MF) is obtained at an output of the MFC 146 and sent out over a serial link.

In various embodiments, the SFCs (e.g., SFC-0, SFC-1, . . . , SFC-n) receive the samples from a number of antenna carrier streams (e.g., AxC0, AxC1, . . . , AxCn) with respective Index([I0, I1, . . . , In]) and Modulo([M0, M1, . . . , Mn]) values programmed. The antenna carrier streams AxC0, AxC1, . . . , and AxCn are associated with respective stream FIFO buffers (e.g., SF-0, SF-1, . . . , SF-n) within the SFCs. The antenna carrier stream assignment to the SFCs is such that the AxCs within the same SFC are not combined or summed (e.g., the Index/Modulo values are programmed to be exclusive for AxCs in the same SFC). Summing is performed between the AxCs of different SFCs when a count value of a Message Slot Counter (MSC) 150 matches the Index and Modulo values such that $$I = (\text{Message Slot Counter value}) \, \text{Modulo} \, M$$

for multiple AxCs, one each from different SFCs. This selection of multiple AxCs for the same slot asserts the summing pipeline enable indication, signal, or flag SPE.

In various embodiments, the PSM 130 is a multi-cycle pipelined module. The PSM 130 can consume multiple clock cycles; in a simplest form the PSM 130 can use an add and store mechanism. The scheme/architecture implemented in accordance with an embodiment of the invention allows any number of AxCs to be combined and tolerates the increased complexity of the PSM 130. When only a single AxC is selected by the MSC 150 in response to finding an index/modulo match, summing is not enabled (e.g., SPE=0) and the sample is written directly to the MFDB 140, bypassing the pipelined summing module (PSM) 130. When multiple AxCs are selected by the MSC 150 in response to finding an index/modulo match, summing is enabled (e.g., SPE=1) and the PSM 130 processes the samples over multiple cycles. A digital delay count (e.g., D) of the processing pipeline is known to the PSM 130 (e.g., calculated based on the maximum number of AxCs allocated for summing). The digital delay count (D) is passed to a Delay Pipeline (DPIPE) block 152, which delays the Message Slot Counter (MSC) 150 by D clock cycles to provide a Master Frame Slot Counter (MFSC) 154 as output. In various embodiments, the digital delay (D) through the DPIPE block 152 can be an estimated value provided by the PSM 130 or can be implemented as a software programmable value based on programmers estimates regarding the PSM 130.

Writes to the MFDB 140 are done continuously with an output of the MSC 150 used as a write pointer (e.g., MWPTR). The write pointer MWPTR increments with each write to the MFDB 140 and is equal to the count of the MSC 150. When summing is not enabled (e.g., SPE=0), valid data (e.g., V) is written to the MFDB 140. When summing is enabled (e.g., SPE=1), the sum of the samples (e.g., MWDATA) will not be immediately available and an Empty Slot Message (e.g., ES) is written to the MFDB 140, and the write pointer MWPTR is incremented. In some embodiments, the empty slot message ES comprises all zeros. At the same time, the pointer to the location of the ES message in the MFDB 140 is written in the ESPB 144 at a location pointed to by a write pointer (e.g., WPTR) and the write pointer WPTR is incremented. The above write mechanism to the MFDB 140 is repeated as the MSC 150 increments.

When the summing is processed, after a delay which is equal to or less than the maximum delay D, the output sample from the PSM 130 is written to the the ESDB 142 at a location pointed to by a write pointer (e.g., DWPTR) and the write pointer DWPTR is incremented. In some embodiments, first output samples from the ESDB 142 and the ESPB 144 are kept readily available in registers (e.g., RSDB and RSPB, respectively) using a pre-fetch mechanism. The MFDB 140 is read and a respective read pointer (e.g., MRPTR) increments with a master frame slot count (MFSC) 154. In various embodiments, the MFSC 154 is implemented as a delayed version of the MSC 150. When the MRPTR matches a pointer RSPTR, RSDATA is inserted into the slot of the master frame (MF) by the master frame combiner (MFC) 146. Thus, an empty slot message (ES) is replaced with the actual processed and delayed summing output. The MSC 150 stalls at each End of Message Group (EOMG) and End of Frame (EOF), allowing time for an EOMG/EOF controls block 148 to insert the special characters (e.g., K28.5, K28.7, etc). The final Master Frame (MF) is obtained at an output of the MFC 146. The final master frame is sent out over a serial link (SerDes) to the receiver.

The assignment of the AxCs to the SFCs is such that the AxCs within the same SFC are not combined or summed (e.g., the Index/Modulo values are programmed to be exclusive for AxCs in same SFC). This reduces the complexity of the IM comparator 132 and provides flexibility to software. The number of stream FIFOs (SFs) in an SFC also can be configured. In some embodiments, a single memory is used for portioning the SFs. It is possible to assign only one AxC to a SFC and use only one SF for the memory instance. The PSM 130 is enabled to obtain an estimate of a maximum value for the digital delay D and produce the pipelined summing output. Sample size can be flexible as summing combinational circuit complexity is handled. As the sample size changes, the number of bits and the adder delays may increase. Although a summing example is used as an illustrative embodiment, functional specifications other than summing (e.g., digital signal processing, etc.) can be accommodated while mapping the multiple stream samples as the pipeline delays are accommodated. A message group counter (MGC) to track the number of message groups is not shown and runs in parallel to the MSC 150 and the MFSC 154. The MGC counts the number of message groups in the master frame. The MGC may be implemented as a standard counter that counts the number of message groups (MGs), e.g., by counting the number of EOMG symbols (e.g., k28.5) in a master frame. The RPTR and DRPTR increment when ESDB(RSDB) and ESPB(RSPB) are read.

Figure 6:
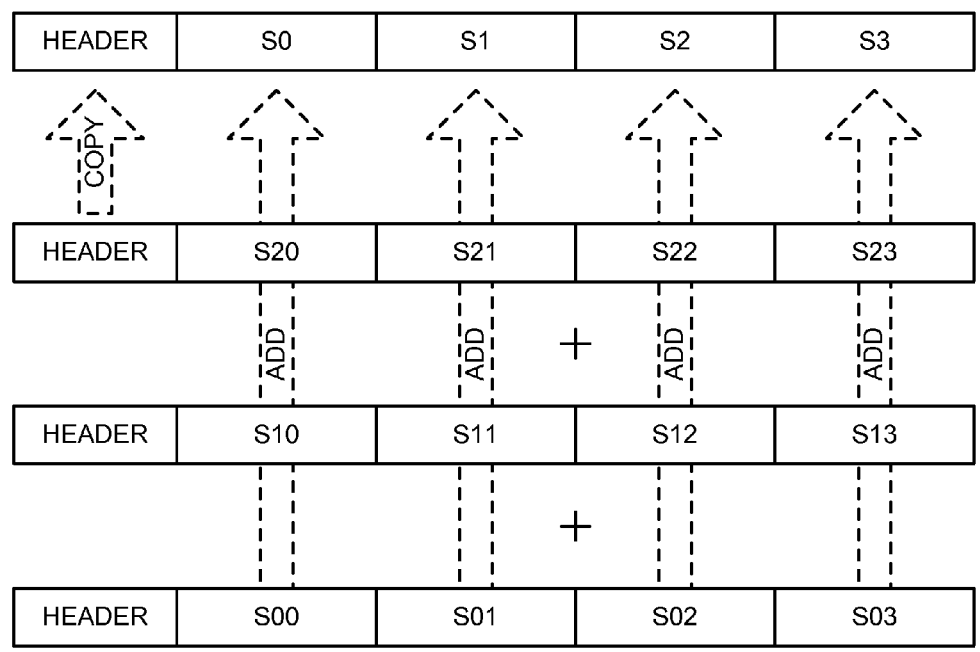
FIG. 6 is a diagram illustrating sample size saturated summing.

Referring to FIG. 6, a diagram is shown illustrating a flexible and scalable architecture for performing sample size saturated summing, which combines more logic to the adders. In other dimension, the number of streams mapped and summed can increase to a large number. For example, the size of samples S0, S1, S2, and S3 can be variable (e.g., 8, 16, or 32 bits). The number of messages may increase to an upward limit also (e.g., 3 streams are shown in FIG. 6). This makes the summing module a delay intensive module. In various embodiments, the mapping architecture is devised such that, the delays of the summing module are easily integrated in to the mapping scheme, which uses free running message/master frame counters.

Figure 7:
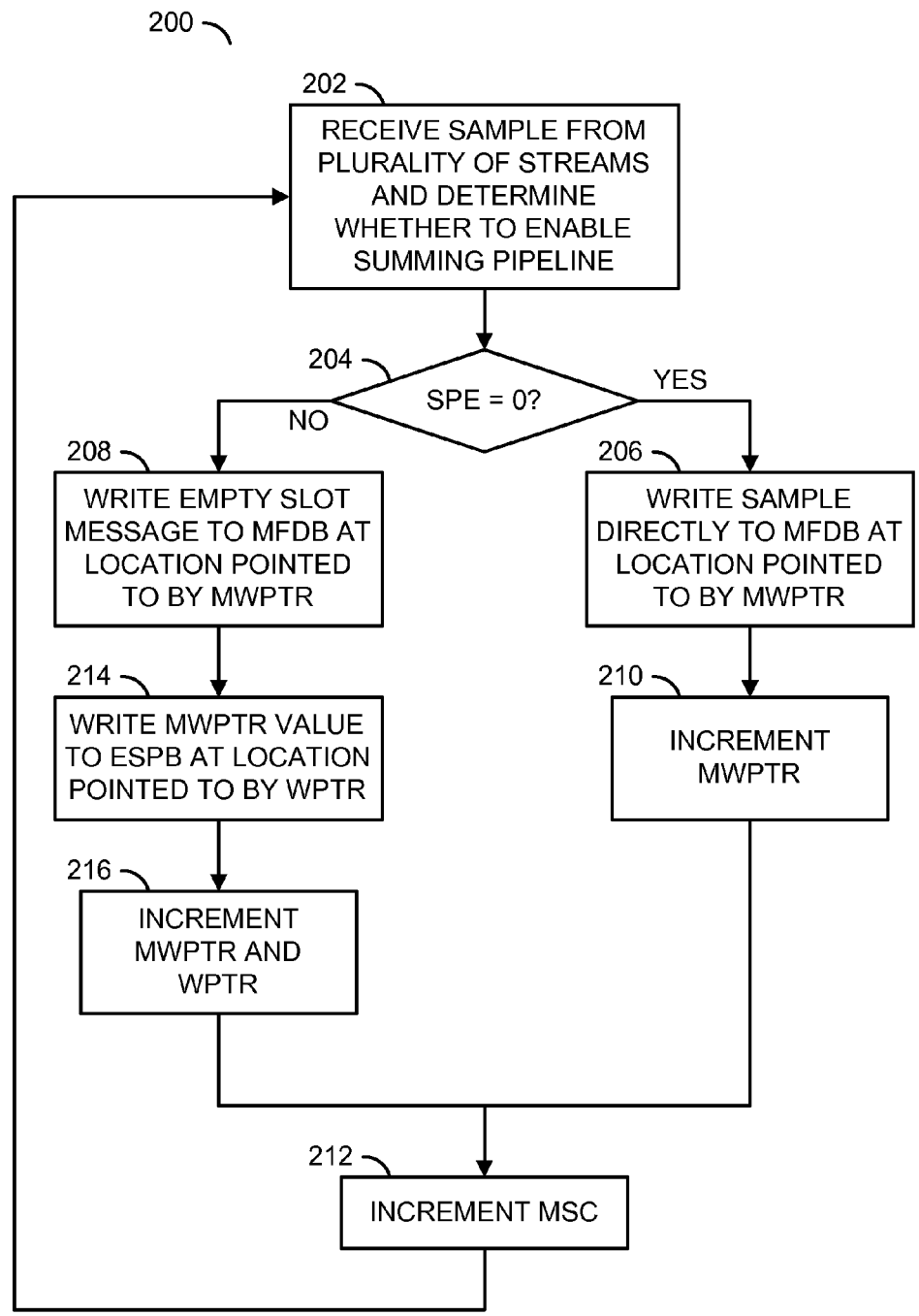
FIG. 7 is a flow diagram illustrating a process for accommodating processing delay in accordance with an example embodiment of the invention.

Referring to FIG. 7, a flow diagram of a process 200 is shown illustrating accommodation of processing delay(s) in accordance with an example embodiment of the invention. In various embodiments, the process (or method) 200 may comprise a number of steps (or states) 202-216. In various instances, the steps 202-216 may be performed to accomplish signal processing (e.g., summing, etc.) and integrated mapping in accordance with embodiments of the invention. In the step 202, the samples from a number of antenna carrier streams with respective Index and Modulo values are received and a determination is made whether to enable the summing pipeline. Summing is performed between the AxCs of different SFCs when a count value of a Message Slot Counter (MSC) 150 matches the Index and Modulo values such that $$I = (\text{Message Slot Counter value}) \text{Modulo } M$$

for multiple AxCs, one each from different SFCs. This selection of multiple AxCs for the same slot asserts the summing pipeline enable indication, signal, or flag SPE.

In a decision step 204, the process 200 moves to a step 206 when summing is not enabled (e.g., SPE=0) and moves to a step 208 when summing is enabled (e.g., SPE=1). In the step 206, the valid sample data (e.g., V) is written to the MFDB 140 at a location pointed to by the write pointer MWPTR, bypassing the pipelined summing module (PSM) 130. The process 200 then moves to a step 210, where the write pointer MWPTR is incremented, and then moves to a step 212. In the step 212, the MSC 150 increments and the process 200 returns to the step 202. The write mechanism to the MFDB 140 is repeated as the MSC 150 increments.

In the step 208, the PSM 130 processes the samples over multiple cycles, thus the sum of the samples (e.g., MWDATA) are not immediately available. An Empty Slot Message (e.g., ES) is written to the MFDB 140 at the location pointed to by the write pointer MWPTR. In some embodiments, the empty slot message ES comprises all zeros. In a step 214, the pointer to the location of the ES message in the MFDB 140 is written in the ESPB 144 at a location pointed to by a write pointer (e.g., WPTR). The steps 208 and 214 may occur at the same time. In a step 216, the write pointer MWPTR and the write pointer WPTR are incremented, and the process 200 moves to the step 212.

Figure 8:
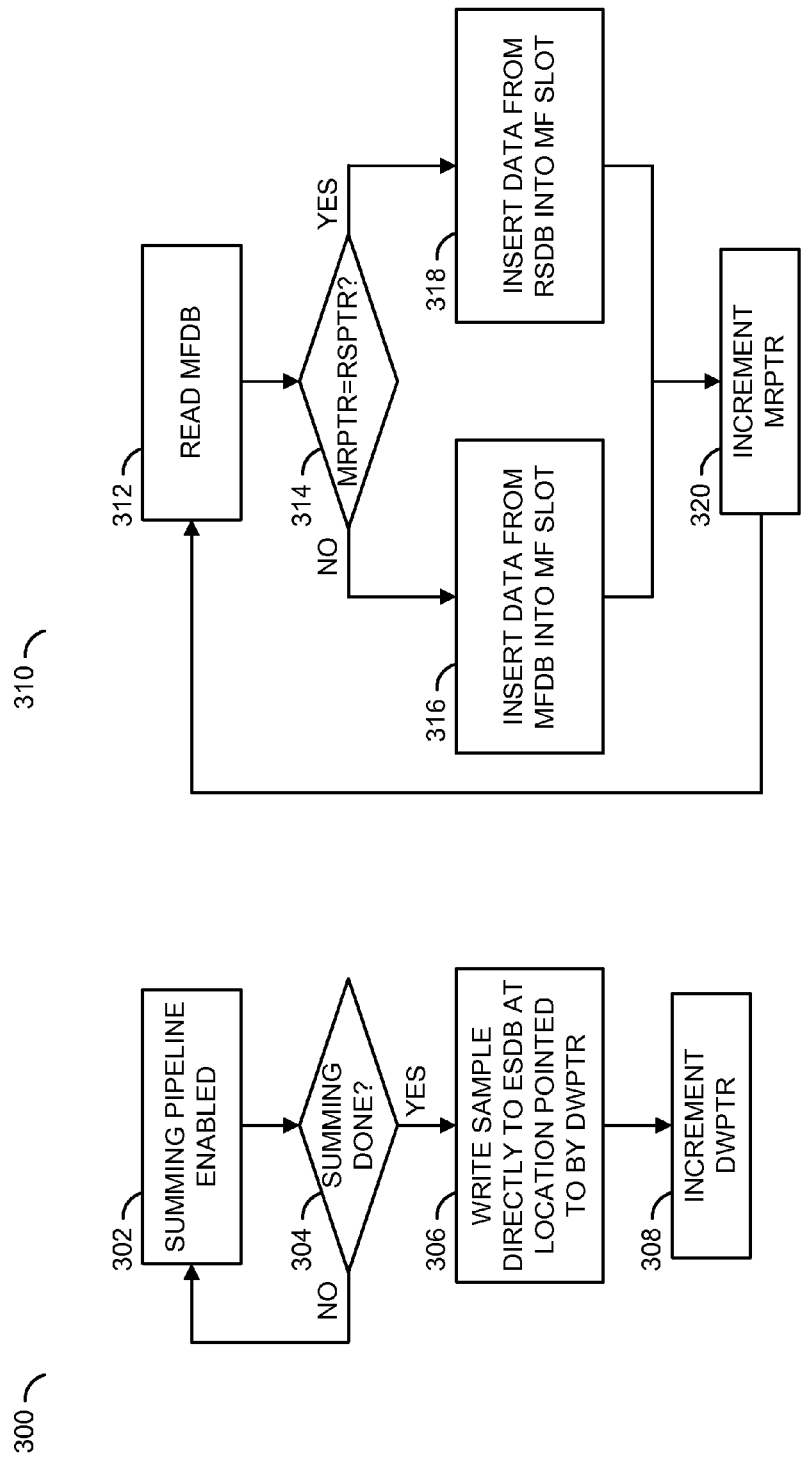
FIG. 8 is a flow diagram illustrating a pipelined summing and integrated mapping process implemented in accordance with an example embodiment of the invention.

Referring to FIG. 8, a flow diagram of a process 300 and a process 310 is shown illustrating a pipelined summing and integrated mapping technique in accordance with an example embodiment of the invention. In various embodiments, the process (or method) 300 may comprise a number of steps (or states) 302-308 and the process (or method) 310 may comprise a number of steps (or states) 312-320. The process 300 may run concurrently with the process 200 illustrated in FIG. 7. The process 300 begins in the step 302 when the summing pipeline is enabled. In a step 304, a check is made whether the summing process is completed. If the summing is not done, the process 300 waits for the summing process to finish. When the summing is completed, the process 300 moves to a step 306. In the step 306, the output sample (or sum) from the PSM 130 is written to the ESDB 142 at a location pointed to by a write pointer (e.g., DWPTR) and the process 300 moves to the step 308. In the step 308, the write pointer DWPTR is incremented. In some embodiments, first output samples from the ESDB 142 and the ESPB 144 are kept readily available in registers (e.g., RSDB and RSPB, respectively) using a pre-fetch mechanism.

The process 310 may be implemented in the master frame combiner 146 to generate the master frame MF. Slots of the master frame are filled using reads from the MFDB 140 and the ESDB 142. In the step 312, the MFDB 140 is read using a respective read pointer (e.g., MRPTR) and the read pointer MRPTR increments with the master frame slot count (MFSC) 154. In various embodiments, the MFSC 154 is implemented as a delayed version of the MSC 150. In a step 314, a check is made to determine whether the read pointer MRDATA matches a pointer RSPTR (e.g., in the ESPB (RSPB) 144). When the MRPTR does not match the pointer RSPTR, the process moves to a step 316. When the MRPTR matches the pointer RSPTR, the process moves to a step 318. In the step 316, MRDATA from the MFDB 140 is inserted into the slot of the master frame (MF) by the main frame combiner (MFC) 146. In the step 318, RSDATA from the ESDB (RSDB) 142 is inserted into the slot of the master frame (MF) by the main frame combiner (MFC) 146. Thus, an empty slot message (ES) in the MFDB is replaced with the actual processed and delayed summing output. The process 310 moves from the steps 316 and 318 to the step 320. In the step 320, the read pointer MRPTR increments. The MSC 150 stalls at each End of Message Group (EOMG) and End of Frame (EOF), allowing time for inserting the special characters (e.g., K28.5, K28.7, etc). The final Master Frame (MP) is obtained at an output of the MFC 146. The final master frame is sent out over a serial link (SerDes) to the receiver.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a first circuit configured to buffer a plurality of antenna carrier sample streams in a buffer cluster and associate each buffer of said buffer cluster with a unique value;
   a second circuit coupled to said first circuit and configured to generate message data through pipelined processing and mapping of said plurality of antenna carrier samples; and
   a third circuit coupled to said second circuit and configured to generate a master frame in response to the processed and mapped message data.

2. The apparatus according to claim 1, further comprising a fourth circuit configured to transmit said master frame serially.

3. The apparatus according to claim 1, wherein said pipelined processing comprises summing said plurality of said antenna carrier samples.

4. The apparatus according to claim 3, wherein said plurality of said antenna carrier samples summed is determined based on comparing an index value and a modulo value associated with each antenna carrier sample to a message slot count.

5. The apparatus according to claim 4, wherein the pipelined processing of the second circuit is enabled when a match is detected between said index value, said modulo value and said message slot count.

6. The apparatus according to claim 4, wherein the apparatus is configured to bypass the pipelined processing of the second circuit when only one antenna carrier sample stream of the plurality of antenna carrier sample streams is in a slot associated with the message slot counter.

7. The apparatus according to claim 1, said buffer cluster includes a plurality of stream first-in first-out (FIFO) clusters, each stream FIFO cluster of said plurality of stream FIFO clusters receiving a number of said plurality of antenna carrier streams.

8. The apparatus according to claim 7, wherein each of said stream FIFO clusters comprises a plurality of first-in first-out (FIFO) buffers, each FIFO buffer associated with a unique index and modulo value.

9. The apparatus according to claim 1, wherein said third circuit further comprises:
   an empty slot data buffer (ESDB);
   an empty slot pointer buffer (ESPB); and
   a master frame data buffer (MFDB) coupled to said ESDB and said ESPB and configured to combine processed and unprocessed samples from the second circuit to form said master frame.

10. The apparatus according to claim 1, wherein said apparatus is part of a base transceiver station architecture.

11. The apparatus according to claim 1, wherein said apparatus is fabricated as one or more integrated circuits used in a radio interface between a radio frequency (RF) module and a base band (BB) module.

12. An apparatus comprising:
    a first circuit configured to buffer a plurality of antenna carrier sample streams;
    a second circuit configured to generate message data through pipelined processing and mapping of said plurality of antenna carrier sample; and
    a third circuit coupled to said second circuit and configured to generate a master frame in response to the processed and mapped message data, said third circuit comprising:
    an empty slot data buffer (ESDB);
    an empty slot pointer buffer (ESPB); and
    a master frame data buffer (MFDB) coupled to said ESDB and said ESPB and configured to combine processed and unprocessed samples from the second circuit to form said master frame.

13. The apparatus according to claim 12, said first circuit comprises a plurality of stream first-in first-out (FIFO) clusters, each cluster of said plurality of stream FIFO clusters receiving a number of said plurality of antenna carrier streams.

14. The apparatus according to claim 13, wherein each cluster of said stream FIFO clusters comprises a plurality of first-in first-out (FIFO) buffers, each FIFO buffer of the plurality of FIFO buffers associated with a unique index and modulo value.

15. A method of processing and mapping messages in radio interface frames comprising the steps of:
    buffering a plurality of antenna carrier sample streams;
    comparing an index value and a modulo value associated with each antenna carrier sample with a message slot count of a message slot counter;
    generating message data through processing and mapping of said antenna carrier samples, wherein said processing and mapping comprises pipelined processing when a match is detected between said index value and said modulo value associated with each antenna carrier sample and said message slot count; and
    generating a master frame in response to the processed, mapped and conditionally pipeline processed message data.

16. The method according to claim 15, wherein said pipelined processing comprises summing said plurality of antenna carrier samples.

17. The method according to claim 15, further comprising:
    bypassing said pipelined processing when only one antenna carrier sample is in a slot of a message slot counter associated with the message slot count.

18. The method according to claim 15, further comprising:
    writing an antenna carrier sample or an empty slot message to a slot in a master frame buffer during each cycle of the message slot counter.

19. The method according to claim 18, further comprising:
    replacing each empty slot message in said master frame buffer with a result of processing a number of corresponding antenna carrier samples.

20. The method according to claim 15, wherein buffering the plurality of antenna carrier sample streams includes receiving said plurality of antenna carrier streams in a plurality of stream first-in first-out (FIFO) clusters, wherein each of said stream FIFO clusters comprises a plurality of first-in first-out (FIFO) buffers, and wherein each FIFO buffer is associated with a unique index value and unique modulo value.

* * * * *